(12) United States Patent
Chou

(10) Patent No.: US 12,333,091 B2
(45) Date of Patent: Jun. 17, 2025

(54) PEN TIP ASSEMBLY, STYLUS, AND METHOD OF PREPARING PEN TIP ASSEMBLY

(71) Applicant: Lenovo (Beijing) Limited, Beijing (CN)

(72) Inventor: ChiehYen Chou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/608,610

(22) Filed: Mar. 18, 2024

(65) Prior Publication Data
US 2024/0329758 A1    Oct. 3, 2024

(30) Foreign Application Priority Data

Mar. 28, 2023   (CN) .......................... 202310313120.6

(51) Int. Cl.
*G06F 3/0354* (2013.01)
(52) U.S. Cl.
CPC ................. *G06F 3/03545* (2013.01)
(58) Field of Classification Search
CPC ........... G02F 1/13452; G02F 1/136213; G02F 1/136286; G09G 3/3611; G09G 3/3648; G09G 3/3677; G09G 3/3688; G09G 2300/0426; G09G 2300/0876; G09G 2320/0204; G09G 2320/0247; H01L 27/124; H01L 27/1255; B23P 15/00; G06F 3/03545
See application file for complete search history.

(56) References Cited

U.S. PATENT DOCUMENTS

| | | | |
|---|---|---|---|
| 10,168,804 B2 * | 1/2019 | Zimmerman | .......... G06F 3/0416 |
| 2013/0249870 A1 * | 9/2013 | Slaby | .................. G06F 3/03545 345/179 |
| 2022/0334661 A1 * | 10/2022 | Barel | .................. G06F 3/03546 |

\* cited by examiner

*Primary Examiner* — Nelson M Rosario
(74) *Attorney, Agent, or Firm* — ANOVA LAW GROUP, PLLC

(57) ABSTRACT

A pen tip assembly includes a first assembly and a second assembly. The first assembly includes a first electrode and a second electrode. The second assembly includes a first connector configured to transmit a first electrical signal to the first electrode and a second connector configured to transmit a second electrical signal to the second electrode. The first assembly is detachably connected to the second assembly. The first assembly is closer to a writing surface of a user than the second assembly.

20 Claims, 3 Drawing Sheets

PEN TIP ASSEMBLY, STYLUS, AND METHOD OF PREPARING PEN TIP ASSEMBLY

CROSS-REFERENCE TO RELATED APPLICATION

The present disclosure claims priority to Chinese Patent Application No. 202310313120.6, filed on Mar. 28, 2023, the entire content of which is incorporated herein by reference.

TECHNICAL FIELD

The present disclosure relates to the electronic device technology field and, more particularly, to a pen tip assembly, a stylus, and a method of preparing the pen tip assembly.

BACKGROUND

A tilt function of a stylus refers to displaying corresponding thick and thin handwriting on a writing surface according to a tilt angle of a pen body relative to the writing surface during writing. To support the tilt function, currently, a type of stylus detects the tilt angle through two sets of electrical signals. However, most of the styluses have certain disadvantages, including poor tilt sensitivity. The pen body needs to be tilted at a large angle to be detected. Thus, the user cannot complete writing smoothly in most scenarios, which affects work efficiency.

SUMMARY

An aspect of the present disclosure provides a pen tip assembly including a first assembly and a second assembly. The first assembly includes a first electrode and a second electrode. The second assembly includes a first connector configured to transmit a first electrical signal to the first electrode and a second connector configured to transmit a second electrical signal to the second electrode. The first assembly is detachably connected to the second assembly. The first assembly is closer to a writing surface of a user than the second assembly.

An aspect of the present disclosure provides a stylus including a pen tip assembly and a pen body. The pen tip assembly includes a first assembly including a first electrode and a second electrode and a second assembly. The second assembly includes a first connector configured to transmit a first electrical signal to the first electrode, and a second connector configured to transmit a second electrical signal to the second electrode. The pen body is fixedly connected to the second assembly. The first assembly is detachably connected to the second assembly. The first assembly is closer to a writing surface of a user than the second assembly.

An aspect of the present disclosure provides a method for preparing a pen tip assembly. The method includes fetching a metal block and tapping on a first end surface of the metal block to form an inner thread, turning an outer surface of the metal block to form a conical segment, a cylindrical segment, and a clearance segment that are coaxial with the inner thread and are arranged in sequence from the first end surface to another end to obtain an electrode body, forming an insulation shell on an outer surface for the electrode body, and drilling from a blind end of a blind hole where the internal thread is located until the cylindrical segment is removed to obtain a first assembly. A small end of the conical segment is away from the first end surface. A cross-section size of the cylindrical segment is smaller than the small end of the conical segment. A cross-section size of the clearance segment is smaller than the cross-section size of the cylindrical segment.

Figure 1:
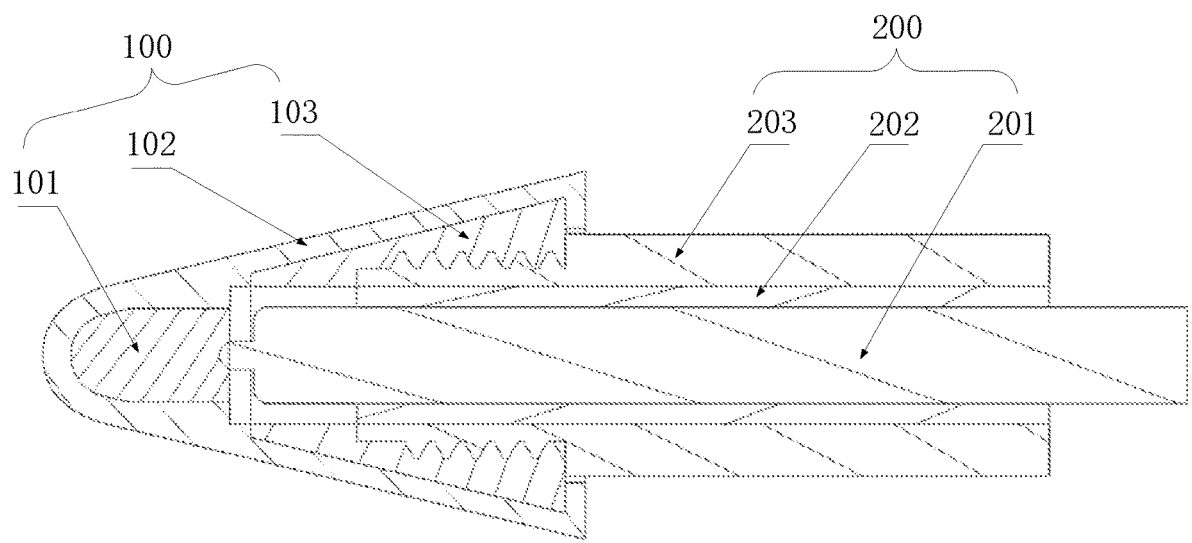
FIG. 1 illustrates a schematic structural diagram of a pen tip assembly according to some embodiments of the present disclosure.

| Reference numerals: | | |
|---|---|---|
| 100 First assembly | 101 First electrode | 102 Insulation layer |
| 103 Second electrode | 200 Second assembly | 201 First connector |
| 202 Insulation member | 203 Second connector | 301 First movable member |
| 302 Elastic member | 400 First end surface | 500 Electrode body |

DETAILED DESCRIPTION OF THE EMBODIMENTS

The present disclosure provides a pen tip assembly, which can be beneficial in improving the tilt sensitivity of a stylus, reducing abnormal writing, and ensuring a user completes a writing task smoothly.

The technical solution of embodiments of the present disclosure is described in detail in connection with the accompanying drawings of embodiments of the present disclosure. Obviously, the described embodiments are only some embodiments of the present disclosure and not all embodiments. All other embodiments obtained by those skilled in the art without creative efforts are within the scope of the present disclosure.

Figure 2:
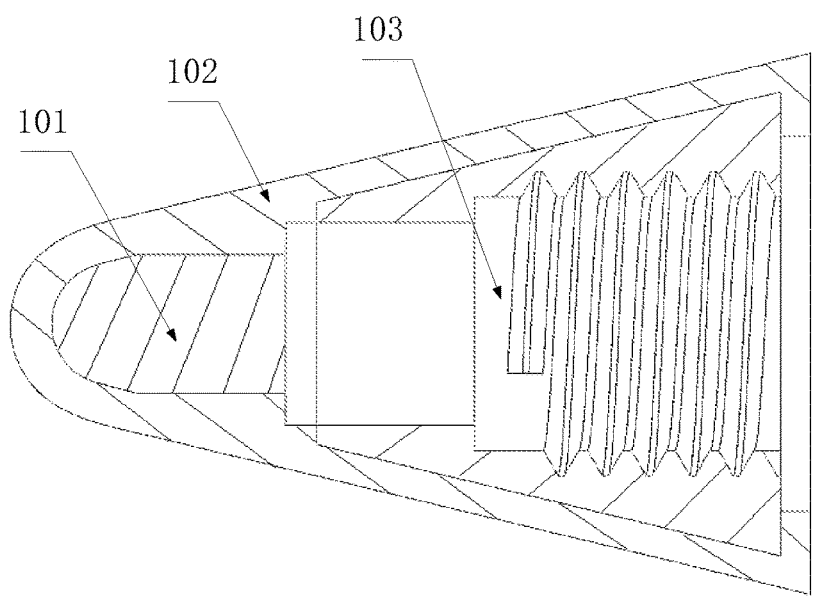
FIG. 2 illustrates a schematic structural diagram of a first assembly 100 in FIG. 1.
Figure 3:
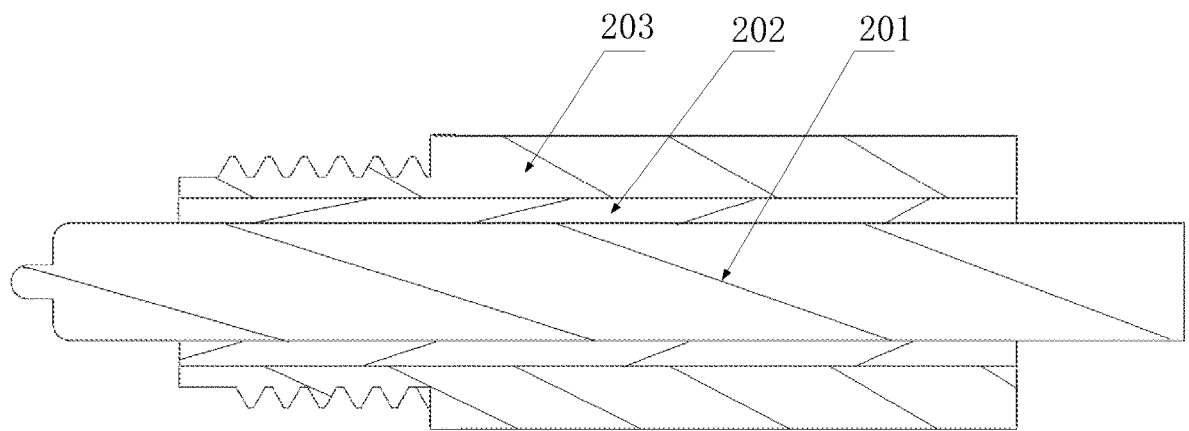
FIG. 3 illustrates a schematic structural diagram of a second assembly 200 in FIG. 2.

As shown in FIGS. 1 to 3, embodiments of the present disclosure provide a pen tip assembly, including a first assembly 100 and a second assembly 200. The first assembly 100 is detachably connected to the second assembly 200. The first assembly 100 is closer to the writing surface of the user than the second assembly 200. That is, the first assembly 100 is closer to a front end of the pen tip assembly of the stylus relative to the second assembly 200. The front end is opposite to the other end of the pen tip assembly, i.e., the rear end. The front end can be an end surface in contact with the writing surface. The first assembly 100 includes a first electrode 101 and a second electrode 103. The second assembly 200 includes a first connector 201 and a second connector 203. The first connector 201 can be configured to transmit a first electrical signal to the first electrode 101. The second connector 203 can be configured to transmit a second electrical signal to the second electrode 103. The first connector 201 and the second connector 203 can be made of conductive materials that are able to transmit electrical signals. The first connector 201 and the second connector 203 can be used as a functional member for transmitting electrical signals and can be also used as a structural member of connecting the pen tip assembly as a whole to the pen body of the stylus. When the pen tip assembly is applied to the stylus, the second assembly 200 can be fixedly connected to the pen body. Since the first assembly 100 is closer to the writing surface of the user than the second assembly 200, the stylus can contact the touch screen through the first assembly 100. After being used for a while, if the pen tip assembly wears off, only the first assembly 100 needs to be replaced, which avoids replacing the whole pen tip assembly and reduces the replacement cost. When the stylus sends two electrical signals supporting the tilt function to the touch screen, a first electrical signal of the two electrical signals can be transmitted to the first electrode 101 for emission from the circuit board of the stylus (i.e., a motherboard inside the pen body) along the first connector 201. The second electrical signal can be transmitted to the second electrode 103 for emission from the circuit board along the second connector 203. Since the first electrode 101 and the second electrode 103 are closer to the first assembly 100 at the front end of the stylus than the second assembly 200, the two signals can be detected by the touch screen more easily. Compared to the existing stylus, the stylus using the pen tip assembly can have high tilt sensitivity without increasing the emission power. Thus, the abnormal writing can be reduced, and the user can be ensured to complete writing smoothly.

In some embodiments, the first electrode 101 and the second electrode 103 can be arranged at an interval along an axial direction of the pen tip assembly. That is, the first electrode 101 and the second electrode 103 can have a certain distance in the axial direction of the stylus. Thus, the mutual interference between the first electrical signal and the second electrical signal can be reduced, which can improve the performance of the stylus. As shown in FIG. 1, in some embodiments, the first electrode 101 is located on a side of the second electrode away from the second assembly 200. That is, the first electrode 101 is closer to the writing surface of the user than the second electrode 103. To detachably connect the first assembly 100 and the second assembly 200, an inner thread is set at the second electrode 103. An outer thread cooperating with the inner thread can be set at the second connector 203. As shown in FIG. 1 to FIG. 3, the outer thread of the second connector 203 can be screwed into the inner thread of the second electrode 103 to connect the second assembly 200 and the first assembly 100. In some other embodiments, the first assembly 100 and the second assembly 200 can also be detachably connected through other connection structures. For example, a plug hole configured to mount the second connector 203 can be configured at the second electrode 103. A protrusion or a depression can be arranged at the inner wall of the plug hole. A depression or a protrusion can be correspondingly arranged at the outer surface of the second connector 203. The second connector 203 can be inserted into the plug hole of the second electrode 103 to connect the second assembly 200 and the first assembly 100 through a concave and convex clamping structure.

The two electrodes at the first assembly 100 can have a plurality of shapes. For example, in some embodiments, since the first electrode 101 is closer to the writing surface of the user than the second electrode 103, an end of the first electrode 101 away from the second electrode 103 can be configured in a hemispherical structure. Thus, the portion of the pen tip assembly contacting the writing surface can be rounded to reduce friction during writing. The second electrode 103 configured to emit the second electrical signal can be further from the writing surface of the user compared to the first electrode 101. To further improve the tilt sensitivity of the stylus, the outer peripheral surface of the second electrode 103 can be configured in a spherical cone shape. A small end of the second electrode 103 can face the first electrode 101. Then, the second electrical signal emitted by the second electrode 103 can be detected by the touch screen more easily without affecting the first electrical signal emitted by the first electrode 101.

The second assembly 200 can be located on a side of the second electrode 103 away from the first electrode 101. The first connector 201 on the second assembly 200 can be connected to the first electrode 101. The first connector 201 can pass through the area where the second electrode 103 is located. Therefore, to avoid the first connector 201 connected to the first electrode 101, the second electrode 103 can be provided with an avoidance structure. For example, in some embodiments, the second electrode 103 can be provided with a center through-hole, and the first connector 201 can be coaxially arranged with the second electrode 103. One end of the first connector 201 can pass through the center through-hole of the second electrode 103 and can be then connected to the first electrode 101.

The material of the electrode of the pen tip assembly can be flexibly selected as needed. The first electrode 101 and the second electrode 103 can be made of the same material or different materials. Considering that the components of the pen tip assembly are small and precise, and are difficult to manufacture and assemble, the first electrode 101 and the second electrode 102 of the present disclosure can be set to the same material. Then, the pen tip assembly can be easily prepared using the method of the present disclosure. The material of the electrode can be set to metal or other conductive materials. To reduce wear off of the touch screen caused by writing, an insulation layer 102 can be arranged at the outer surface of the first assembly 100. As shown in FIG. 1 and FIG. 2, the insulation layer 102 at least covers the outer surface of the first electrode 101 and the outer surface of the second electrode 103. To not affect the electrode in emitting an electrical signal to the touch screen, the material of the insulation layer 102 can be set to rubber or polyoxymethylene. Considering the different requirements of users for friction during writing, the material of the insulation layer 102 can be set to non-conductive hard rubber or non-conductive soft rubber to produce a plurality of kinds of pen tip assemblies with different writing tactile sensations for consumers to choose from. The insulation layer 102 made of non-conductive hard rubber can have a smaller contact area with the touch screen during writing. Thus, the pen tip assembly with the insulation layer 102 made of non-conductive hard rubber can have a smaller resistance during writing.

As shown in FIG. 3, in some embodiments, the first connector 201 and the second connector 203 are coaxially arranged. The second connector 203 can have a tube shape. The first connector 201 is located on the center axis of the second connector 203. An insulation member 202 can be arranged in an annular chamber between the first connector 201 and the second connector 203. The insulation member 202 can have a support and shape function and also helps to reduce mutual interference between the electrical signals transmitted by the two connectors. The second assembly 200 can be configured to connect the pen tip assembly as a whole to the pen body. The second assembly can be detachably or non-detachably connected to the pen body. When the second assembly 200 is mounted with the first assembly, the first connector 201 can contact the first electrode 101. To cause the first connector 201 to contact the first electrode 101 more reliably, and avoid rigid abutting to squeeze and damage a part of the members, a member that can move elastically along the axial direction of the pen tip assembly can be arranged at the first connector 201 and/or the first electrode 101 to provide a buffer when the first connector 201 contacts the first electrode 101.

Figure 4:
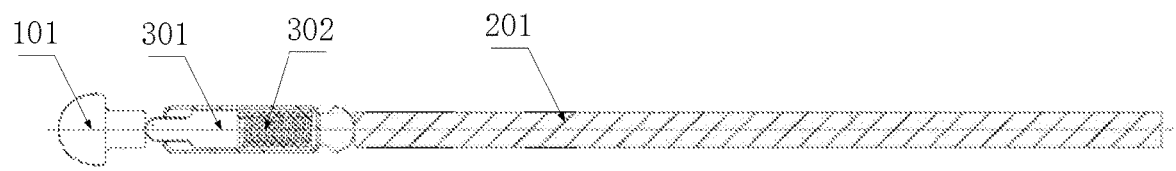
FIG. 4 illustrates a schematic diagram showing a connection method of a first electrode 101 and a first connector 201 according to some embodiments of the present disclosure.

As shown in FIG. 4, in some embodiments, a first movable member 301 that is able to elastically move along the axial direction of the pen tip assembly is provided at the end of the first connector 201 close to the first electrode 101. The first electrode 101 abuts against the first movable member 301. In some embodiments, the first movable member 301 can be arranged inside a cylinder fixedly connected to the first connector 201. An elastic member 302 abutting against the first movable member 301 is provided inside the cylinder. The elastic member 302 can be a spring, as long as the elastic member 302 can elastically deform along the axial direction of the pen tip assembly. The first connector 201 can be configured to transmit the first electrical signal to the first electrode 101 through the first movable member 301. When the first electrode 101 and the first connector 201 are assembled and connected, the first movable member 301 can move along the axial direction of the pen tip assembly to provide a buffer function. Thus, the components may not be damaged due to compression.

A second movable member that is able to elastically move along the axial direction of the pen tip assembly can also be arranged at one end of the first electrode 101 close to the first connector 201. The first connector 201 can abut against the second movable member, which can also provide a buffer function when the first electrode 101 and the first connector 201 are assembled and connected. To implement the pressing function of the stylus, i.e., the function of the touch screen displaying handwriting with different thicknesses according to the different writing pressures, a pressure sensor abutting against the first movable member 301 in the cylinder.

The present disclosure also provides a stylus. The stylus can include the pen body and the pen tip assembly of embodiments of the present disclosure. The pen body can be fixedly connected to the second assembly 200. Since the pen tip assembly of embodiments of the present disclosure has the above technical effects, the stylus having the pen tip assembly can also have the above technical effects, which are not repeated here.

In the present specification, structures of various parts are described in a progressive manner. For the structure of each part, the focus of the description is the difference from the existing structure. The pen tip assembly and the overall structure and a part of the structure of the stylus can be obtained by combining the structures of the plurality of parts.

Figure 5:
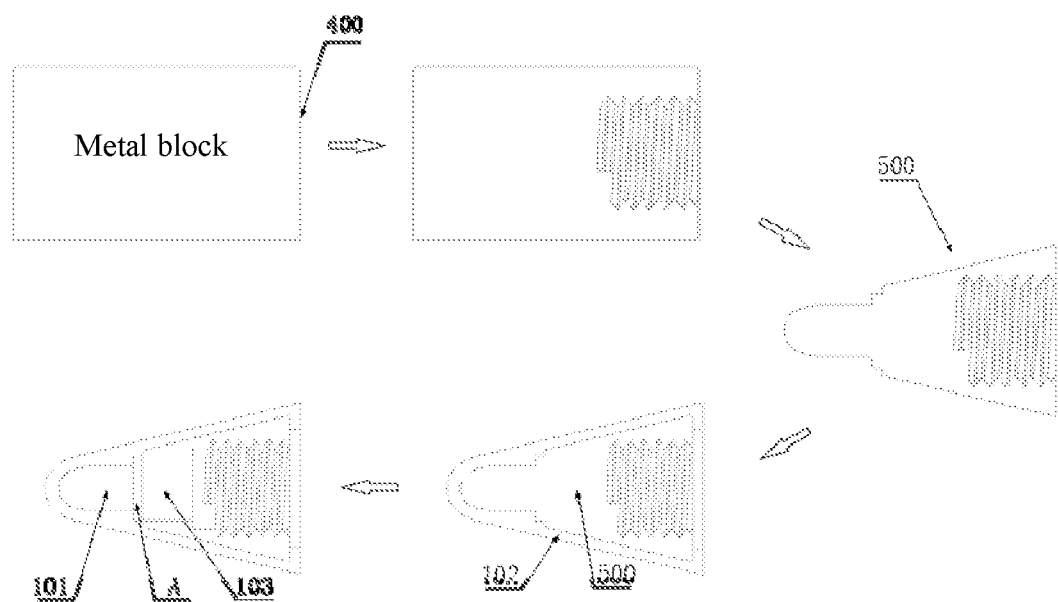
FIG. 5 illustrates a schematic flowchart of a method of preparing a pen tip assembly according to some embodiments of the present disclosure.

The present disclosure also provides a method for preparing the pen tip assembly. The pen tip assembly can include the first assembly 100. The first assembly 100 can include the first electrode 101 and the second electrode 103. As shown in FIG. 5, according to the process sequence indicated by the hollow arrows in the figure, the method includes the following steps.

At S1, a metal block is fetched, and a first end surface 400 of the metal block is taped to form an internal thread.

In the material preparation stage, a cylindrical metal block can be selected. The internal thread formed in step S1 can be a connection structure that can detachably connect the first assembly 100 and another member. That is, the first assembly 100 can be assembled onto other members in subsequent use through the internal thread. In step S1, the threaded hole where the internal thread is can be a blind hole. That is, the tapping may not penetrate the metal block. As shown in FIG. 5, a tapping depth is generally less than half of the length of the metal block.

At S2, the outer surface of the metal block is turned to form a conical segment, a cylindrical segment, and a clearance segment that are coaxial with the internal thread and are arranged from the first end surface 400 to the other end to obtain an electrode body 500. A smaller end of the conical segment can be away from the first end surface 400. A cross-section size of the cylindrical segment can be smaller than the smaller end of the conical segment. A cross-section size of the clearance segment can be smaller than the cross-section size of the cylindrical segment.

The electrode body 500 can be a semi-finished product in the process of preparing the first electrode 101 and the second electrode 103. The conical segment can form the second electrode 103. Thus, the length of the conical segment can be greater than the depth of the threaded hole formed in step S1. The clearance segment can form the first electrode 101. When the pen tip assembly is applied to the stylus, the first electrode 101 can be closer to the writing surface of the user than the second electrode 103. Thus, in step S2, an end of the clearance segment away from the first end surface 400 can be turned into a hemisphere. Thus, the round and smooth part of the first electrode 101 can contact the touchscreen.

At S3, an insulation shell is adhered to the outer surface of the electrode body 500.

As shown in FIG. 5, the insulation shell forms an insulation layer 102 covering the first electrode 101 and the second electrode 103. The insulation shell can be attached to the outer surface of the electrode body 500 in various methods. For example, the insulation shell can be pre-prepared with rubber. Then, the electrode body 500 can be inserted into the insulation shell in step S3. The insulation shell and the electrode body 500 can be fixedly connected through glue. For another example, the electrode body 500 can be placed in a mold with a chamber. Then, the insulation shell can be formed between the outer surface of the electrode body 500 and the inner wall of the chamber using injection molding.

At S4, tapping is performed on a blind end of the blind hole where the inner thread is located until the cylindrical segment is removed to obtain the first assembly 100.

As shown in FIG. 5, the conical segment and the clearance segment of the electrode body 500 can be connected by a cylindrical segment. The cylindrical segment can be removed using a milling process. Thus, area A of the insulation shell of the electrode body 500 can be divided into two to form the first electrode 101 and the second electrode 103. Moreover, when the cylindrical segment is removed, the formed hole can cause the center of the second electrode 103 to form a through hole. Thus, the member connected to the first electrode 101 can pass through the member.

The above description of embodiments of the present disclosure enables those skilled in the art to implement or use the present disclosure. Various modifications to these embodiments are apparent to those skilled in the art. The general principles defined herein can be implemented in some other embodiments without departing from the spirit or scope of the present disclosure. Thus, the present disclosure is not limited to embodiments of the present disclosure but conforms to the widest scope consistent with the principles and novel features of the present disclosure.

What is claimed is:

1. A pen tip assembly comprising:
   a first assembly including a first electrode and a second electrode;
   a second assembly including:
   a first connector configured to transmit a first electrical signal to the first electrode; and
   a second connector configured to transmit a second electrical signal to the second electrode, wherein the second connector wraps around the first connector tubularly and the first connector and the second connector are separated by an insulation member;
   wherein:
   the first assembly is detachably connected to the second assembly; and
   the first assembly is closer to a writing surface of a user than the second assembly.

2. The pen tip assembly according to claim 1, wherein:
   the first electrode is closer to the writing surface of the user than the second electrode;
   the second electrode is provided with an internal thread;
   the second connector is provided with an external thread; and
   the first assembly is detachably connected to the second assembly by screwing the internal thread with the external thread.

3. The pen tip assembly according to claim 2, wherein an outer peripheral surface of the second electrode is in a spherical cone shape, and a small end of the second electrode faces the first electrode.

4. The pen tip assembly according to claim 3, wherein an end of the first electrode away from the second electrode is in a hemispherical shape.

5. The pen tip assembly according to claim 1, wherein the first electrode and the second electrode are made of a same material.

6. The pen tip assembly according to claim 1, wherein:
   an outer surface of the first assembly is provided with an insulation layer; and
   the insulation layer covers an outer surface of the first electrode and an outer surface of the second electrode.

7. The pen tip assembly according to claim 6, wherein the material of the insulation layer is non-conductive hard rubber or non-conductive soft rubber.

8. The pen tip assembly according to claim 1, wherein:
   a first movable member that is able to elastically move along an axial direction of the pen tip assembly is arranged at an end of the first connector close to the first electrode, and the first electrode abuts against the first movable member; or
   a second movable member that is able to elastically move along the axial direction of the pen tip assembly is arranged at an end of the first electrode close to the first connector, and the first connector abuts against the second movable member.

9. A stylus comprising:
   a pen tip assembly including:
   a first assembly including a first electrode and a second electrode;
   a second assembly including:
   a first connector configured to transmit a first electrical signal to the first electrode; and
   a second connector configured to transmit a second electrical signal to the second electrode, wherein the second connector wraps around the first connector tubularly and the first connector and the second connector are separated by an insulation member; and
   a pen body fixedly connected to the second assembly;
   wherein:
   the first assembly is detachably connected to the second assembly; and
   the first assembly is closer to a writing surface of a user than the second assembly.

10. The stylus according to claim 9, wherein:
    the first electrode is closer to the writing surface of the user than the second electrode;
    the second electrode is provided with an internal thread;
    the second connector is provided with an external thread; and
    the first assembly is detachably connected to the second assembly by screwing the internal thread with the external thread.

11. The stylus according to claim 10, wherein an outer peripheral surface of the second electrode is in a spherical cone shape, and a small end of the second electrode faces the first electrode.

12. The stylus according to claim 11, wherein an end of the first electrode away from the second electrode is in a hemispherical shape.

13. The stylus according to claim 12, wherein the first electrode and the second electrode are made of a same material.

14. The stylus according to claim 9, wherein:
    an outer surface of the first assembly is provided with an insulation layer; and
    the insulation layer covers an outer surface of the first electrode and an outer surface of the second electrode.

15. The stylus according to claim 14, wherein the material of the insulation layer is non-conductive hard rubber or non-conductive soft rubber.

16. The stylus according to claim 9, wherein:
    a first movable member that is able to elastically move along an axial direction of the pen tip assembly is arranged at an end of the first connector close to the first electrode, and the first electrode abuts against the first movable member; or
    a second movable member that is able to elastically move along the axial direction of the pen tip assembly is arranged at an end of the first electrode close to the first connector, and the first connector abuts against the second movable member.

17. A method for manufacturing a pen tip assembly comprising:
    fetching a metal block and tapping on a first end surface of the metal block to form an inner thread;
    turning an outer surface of the metal block to form a conical segment, a cylindrical segment, and a clearance segment that are coaxial with the inner thread and are arranged in sequence from the first end surface to another end to obtain an electrode body, a small end of the conical segment being away from the first end surface, a cross-section size of the cylindrical segment being smaller than the small end of the conical segment, and a cross-section size of the clearance segment being smaller than the cross-section size of the cylindrical segment;
    forming an insulation shell on an outer surface of the electrode body; and
    drilling from a blind end of a blind hole where the internal thread is located until the cylindrical segment is removed to obtain a first assembly;

wherein the second connector wraps around the first connector tubularly and the first connector and the second connector are separated by an insulation member.

18. The method according to claim 17, wherein:
the cylindrical segment is removed to separate the clearance segment and the conical segment;
the clearance segment forms a first electrode; and
the conical segment forms a second electrode.

19. The method according to claim 17, wherein a second assembly is connected to the first assembly and includes:
a first connector connected to the first electrode through a through-hole formed at the blind hole end by removing the cylindrical segment; and
a second connector with an external thread threadedly connected to the second electrode with an internal thread.

20. The method according to claim 19, wherein:
the first connector is configured to transmit a first electrical signal to the first electrode; and
the second connector is configured to transmit a second electrical signal to the second electrode;
the first assembly is detachably connected to the second assembly; and
the first assembly is closer to a writing surface of a user than the second assembly.

* * * * *